(12) United States Patent
Toas et al.

(10) Patent No.: US 7,780,816 B2
(45) Date of Patent: Aug. 24, 2010

(54) FIBROUS INSULATION WITH FUNGICIDE

(75) Inventors: Murray A. Toas, Norristown, PA (US); Pierre C. Herault, North Wales, PA (US); Sanford S. Moyer, Harleysville, PA (US); Joseph A. Michetti, Springfield, PA (US)

(73) Assignee: CertainTeed Corporation, Valley Forge, PA (US)

( * ) Notice: Subject to any disclaimer, the term of this patent is extended or adjusted under 35 U.S.C. 154(b) by 772 days.

(21) Appl. No.: 10/963,349

(22) Filed: Oct. 12, 2004

(65) Prior Publication Data

US 2006/0078720 A1    Apr. 13, 2006

(51) Int. Cl.
*D21F 11/00* (2006.01)
*D04H 1/00* (2006.01)

(52) U.S. Cl. .................................. 162/129; 428/292.1
(58) Field of Classification Search ............... 428/292.1
See application file for complete search history.

(56) References Cited

U.S. PATENT DOCUMENTS

| | | | |
|---|---|---|---|
| 3,998,944 | A | 12/1976 | Long |
| 4,764,420 | A | 8/1988 | Gluck et al. |
| 5,393,335 | A | 2/1995 | Puckett et al. |
| 5,569,513 | A * | 10/1996 | Fidler et al. ............. 428/35.6 |
| 6,399,694 | B1 | 6/2002 | McGrath et al. |
| 6,521,086 | B2 * | 2/2003 | Smith, Jr. ................ 162/156 |
| 2003/0040239 | A1 | 2/2003 | Toas et al. |
| 2004/0116016 | A1 | 6/2004 | Delaviz et al. |
| 2004/0118511 | A1 | 6/2004 | Dong et al. |
| 2004/0185211 | A1 | 9/2004 | Fay et al. |
| 2004/0185212 | A1 | 9/2004 | Bogrett et al. |
| 2005/0112374 | A1 | 5/2005 | Jaffee et al. |

FOREIGN PATENT DOCUMENTS

| | | |
|---|---|---|
| AT | 409 866 B | 12/2002 |
| CN | 01031738 A | 3/1989 |
| CN | 1270254 | 10/2000 |
| CN | 1271795 | 11/2000 |
| EP | 0170981 | 2/1986 |
| EP | 0424701 | 5/1991 |
| GB | 02211519 | 7/1989 |
| HU | 048317 | 5/1989 |
| JP | 47900086 | 3/1986 |
| JP | 12799088 | 1/1988 |
| JP | 199497091 | 8/1991 |

(Continued)

OTHER PUBLICATIONS

Rohm and Haas, Markets and Products, Kathon® and Neolone™, Trade Literature, pp. 1-3, Nov. 2004.

(Continued)

*Primary Examiner*—D. Lawrence Tarazano
*Assistant Examiner*—Camie S Thompson
(74) *Attorney, Agent, or Firm*—Duane Morris LLP

(57) ABSTRACT

A fibrous insulation has insulation fibers (104) with a fungicide in a dispersed additive affixed to the fibers (104), and a method of making a fibrous insulation by dispersing a fungicide and a dispersed additive on the fibers (104) followed by affixing the dispersed additive on the fibers (104). The method produces thermal, acoustic, duct liner or board insulation either as loose fill insulation or as an insulation mat.

13 Claims, 4 Drawing Sheets

FOREIGN PATENT DOCUMENTS

| JP | 73295092 | 3/1992 |
|----|----------|--------|
| JP | 343796092 | 11/1992 |
| JP | 11061697 | 3/1999 |
| JP | 11181697 | 7/1999 |
| JP | 11222796 | 8/1999 |
| JP | 11256494 | 9/1999 |
| JP | 1133596 | 12/1999 |
| JP | 2000080596 | 3/2000 |
| JP | 2000086413 | 3/2000 |
| JP | 2000 93345 | 4/2000 |
| JP | 2000110099 | 4/2000 |
| JP | 2000119995 | 4/2000 |
| JP | 2000192396 | 7/2000 |
| JP | 2000248488 | 9/2000 |
| JP | 2000248495 | 9/2000 |
| JP | 2001288697 | 10/2001 |
| JP | 20011271293 | 10/2001 |
| JP | 2002 37789 | 2/2002 |
| WO | WO 99 00426 | 8/1999 |
| WO | WO 02/092528 | 11/2002 |

OTHER PUBLICATIONS

Rohm and Haas, Markets and Products, Personal Care, Kathon® CG and Kathon® CG II, Trade Literature, pp. 1-2, Nov. 2004.
Rohm and Haas, Markets and Products, Pulp and Paper, Trade Literature, pp. 1-2, Nov. 2004.
Rohm and Haas, Environmental Achievements, Dissipation of Kathon® WT biocide by degradation and dilution throughout the papermaking process, Trade Literature, pp. 1-3, Nov. 2004.
PAN Pesticides Database—Pesticide Products, Google Product Search Results, pp. 1-5, Nov. 2004.
CertainTeed Specification Sheet, CertaPro™ AcoustaBlanket™ Blank, 10/1002, 2 pages.
Submittal Sheet, Owens Corning®, Aeromat® Duct Liner, Dec. 1998, 2 pages.
International Search Report in PCT/US05/36475 dated Oct. 12, 2006.
Daisan, Sanitary & Paper Products: "Kokin Mask", New Cosmetic & Household Products in Japan, Jul. 15, 1998, ISSN 0362-4331, Abstract, Japan.
Research & Development: Totsuya Enters Antibacterial Packaging Business, New Cosmetic & Household Products in Japan, Apr. 15, 1998, ISSN 0362-4331, Abstract, Japan.
Antibacterial Washi Paper for Japanese-Style Dinner Tray, Innovative New Packaging in Japan, Jul. 15, 1997, Abstract, Japan.
Antibacterial Paper Finds First Use as a Food Container, Innovative New Packaging in Japan, Jul. 15, 1997, Abstract, Japan.
Atech's Antibacterial Japanese-style Catching Notice, Innovative New Packaging in Japan, Jun. 15, 1997, Abstract, Japan.
Totsuya Enters Antibacterial Packaging Business, Innovative New Packaging in Japan, Jun. 15, 1997, Abstract, Japan.
Shellfish paper additive developed, Pulp & Paper, 1994-11-00, p. 29, ISSN 0033-4081, Abstract, Japan.
Adaptation to fungicides of fungi damaging paper, Int. Biodeterior. Biodegrad., 2001, V 48, No. 1-4, pp. 225-262, ISSN 0964-8305, Heading Info.
Okazaki, Industrial outlook on high-performance paper, Kinoshi Kenkyu Kaishi, 1999, V38, pp. 93-101, Heading Info.
Zheng, Stabilization of chlorine dioxide and its use as bactericides and paper bleaching agent, Huaxue Shijie, 2000, V41, No. 5, pp. 235-236, 244, Heading Info.
Kleeman, Biocides in the production of packaging papers, Papermakers Conference Proceedings, 1999, V2, pp. 805-812, Abstract.
Effect of chitosan surface treatment on the antibacterial properties of paper, Palpu, Chongi Gisul, 1998, V 30, No. 4, pp. 59-68, Korea, Heading Info.
New bactericide far more effective for paper use, Jpn. Chem. Week. Jul. 29, 1993, V34, No. 1735, p. 2, ISSN 00471755, Abstract, Japan.
Cleaner Paper Making with Fungus Enzyme, Paper Asia, Sep. 1, 1997, p. 4, Abstract.
Ricelli, et al., Fungal growth on samples of paper, Restaurator, 1999, 20, No. 2, pp. 97-100, Abstract.
Haack et al., Tetrakishydroxymethyl Phosphonium Sulfate (THPS), Conference Literature, Oct. 6, 1997, pp. 1115-1120, TAPPI Press, Abstract UK.
Makushina, Possibility of Using Tall-Oil in the Production of Decay-Resistant Waxed Paper,Sbornik Nauchnykh Trudov UrkNIIB, Lozovik, Ed, 1990, pp. 146-152, Abstract.
Standard Test Methods for Mildew (Fungus) Resistance of Paper and Paperboard, Annual Book of ASTM Standards, 1993, V15.09: pp. 360-363, Abstract.
Fungus Resistance of Paper and Paperboard, TAPPI Test Method, 1993, Abstract.
Woo, Antibacterial and Antifungal Control in the Process of Pulp and Paper Manufacture, J. Tappik, 1990, V22, No. 3, pp. 64-74, Abstract, Korea.
Ma et al., Shanghai Pulp Pap., Sep. 1990, Abstract, China.
Marconi, et al., Development of Cellulolytic Fungi in Relation to pH, Boll. Ist. Centrale Patol. Libro, 1986, V40, pp. 125-144, Abstract, Italy.
Aitken, et al., Paper and Paperboard Resistance to Fungi, Rev. ATIP, Mar. 1989, V43, No. 3:94, pp. 105-108, Abstract, France.
Osanov et al., Paper and Paperboard in Tropical Climatic Conditions, Sb. Tr. TsNIIB, Novoe Proizvod. Bumagi, 1985, pp. 73-80, Abstract, Russia.
Fungus Resistance of Paper and Paperboard, TAPPI Provisional Test Method, 1985, Heading Info.
Chiou et al., Study on the Fungal Resistance of Paper, Bull. Taiwan Forestry Res. Inst., Jul. 1983, No. 392, pp. 1-6, Abstract, China.
Zagulyaeva, et al., Some Organic Tin Compounds and Fungus Resistance of Paper, Problemy Sokhrannosti Dokumental'nykh Materialov, 1977 pp. 77-78, Abstract, Russia.
Zagulyaeva, et al., Method of Obtaining Fungus-Resistant Paper, Problemy Sokhrannosti Dokumental'nykh Materialov, 1977 pp. 72-74. Abstract. Russia.
Zagulyaeva, et al., Method for Determining the Fungus Resistance of Paper, Problemy Sokhrannosti Dokumental'nykh Materialov, 1977 pp. 68-72, Abstract. Russia.
Cervio, Fungus-Resistant Papers and Boards, Carotec. Imballagio, Sep. 1982, V 2, No. 6, pp. 38-42, Abstract, Italy.
Trobas, Damage to Paper and Parchment—Causes and Cure (Conclusion), Bindetech, Reliure, Apr. 1980, V 2, No. 4, pp. 99-105, Abstract, France.
Nyuksha et al., Use of Enzyme Preparations to Evaluate the Fungus Resistance of Paper, Mikol. Fitopatol., 1977, V11, No. 5, pp. 393-398, Abstract, Russia.
Shema, Registration of Microbicides Used in the Pulp and Paper Industry, Conference Literature, Jun. 1980, Tappi V63, No. 6, pp. 59-60, Abstract, US.
Minami et al., Analytical Procedures for 2-(4-thiazolyl)Benzimidazole Fungicide in Treated Papers, Bokin Bobai (Bactericides & Fungicides), 1978, V6, No. 1, pp. 3-8, Abstract, Japan.
Surma-Slsarska, Biotechnology and developments in the pulp and paper industry, 13th International Papermaking Conference Sep. 22-24, 1999, pp. IV-7-1-IV-7-17, Abstract, Poland.
Lee et al., Manufacture of antimicrobial paper for food products, Pre-symposium of the 10th ISWPC, Jun. 2-4, 1999, pp. 217-220, Abstract, Korea.
Progress Energy, Insulation/R-Values, Trade Literature, Oct. 15, 2004, pp. 1-3.
FurnaceCompare, Insulation and R-Values, Trade Literature, Oct. 15, 2004, pp. 1-2.
Cascades, Kraft Paper, Trade Literature, Oct. 15, 2004, p. 1.
Extended European Search Report dated Sep. 20, 2007 in EP 05810220.3 (D3310-00021).
XP-002449312, Derwent Publications, Database WPI / Thomson, 2004, 2 pages.

\* cited by examiner

FIBROUS INSULATION WITH FUNGICIDE

CROSS REFERENCE TO RELATED APPLICATIONS

The present application relates to U.S. application Ser. No. 10/772,063, filed Feb. 4, 2004 incorporated herein by reference. The present application relates to U.S. application Ser. No. 10/869,994, filed Jun. 17, 2004 incorporated herein by reference.

FIELD OF THE INVENTION

The invention relates generally to the field of fibrous insulation, particularly, a loose fill fibrous insulation or a mat of fibrous insulation.

BACKGROUND OF THE INVENTION

Fibrous insulation is manufactured by forming fibers from a molten mineral bath, which are forced through a spinner rotating at a high number of revolutions per minute. Fine fibers are produced thereby. To manufacture loose fill insulation, or wool type insulation, a plurality of the fibers are loosely accumulated together to form loose fill insulation. Alternatively, to make a mat of insulation, a plurality of the fibers are sprayed with a fluid binder mix or powder binder, typically a phenolic resin, a thermoplastic, a thermosetting plastic, an acrylic, vinyl-acrylic or other soluble polymer. The fibers are accumulated on a conveyer to form a thick mat. The binder is then cured in a curing oven. The uncured mat may be further adapted for duct liner, duct board or pipe insulation before curing. Alternatively, the mat is then sliced and/or chopped into individual insulation batts. In some cases, a facing material is applied to cover at least one side of the mat with a vapor retarder.

Fibrous insulation is vulnerable to fungal growth due to exposure to microbiological organisms, especially when the insulation is installed in damp environments, such as, subterranean basements, and poorly vented cavities under a roof, for example.

U.S. Pat. No. 6,399,694 discloses a practice of adding a fungicide to a batt while still on a conveyor, but subsequent to manufacture of fibers that are bonded together by a binder. U.S. Pat. No. 6,399,694 discloses a further practice of adding a fungicide to a batt in the field, at a location where the batt is to be installed. In each of these disclosed practices, the fungicide is externally applied to the binder, and the binder itself is not mold resistant. In each of these disclosed practices, manufacturing controls are lacking to control the fungicide concentration and to control dispersal of the fungicide in an even distribution throughout the batt. WO 02/092578 A1 discloses borax for infrared absorbing and scattering, but not for a fungicide.

Thus, prior to the invention, adding fungicide to a completed batt lacks manufacturing controls to apply the fungicide with a controlled concentration. For example, manufacturing controls would be needed to prevent the fungicide from being handled and applied at potentially toxic levels of concentration. Further, manufacturing controls would be needed to establish a justification for advertising and labeling the fibrous insulation as being mold resistant. Further, for example, in the future, a manufacturer of a fungicide may develop a recommended concentration to resist fungal growth, which would require manufacturing controls to apply the fungicide at the manufacturer's recommended concentration.

Lacking manufacturing controls while adding a fungicide to a batt could induce instability in the measured physical properties of the batt. Thus, controlled amounts of fungicide avoid inducing the physical instability as found by testing the batt to meet industry standards for thickness recovery and other physical properties.

Accordingly, there is a present need for a fibrous insulation having a controlled fungicide concentration. Further, there is a present need for a method of making a fibrous insulation with a controlled fungicide concentration.

Further, there is a present need for a fibrous insulation having a dispersed additive that serves a useful function in the fibrous insulation, and further a fungicide is combined with the dispersed additive. Further, there is a present need for a fibrous insulation having a dispersed additive that is mold resistant. Further, there is a present need for a manufacturing process for dispersing a fungicide by a binder as the dispersed additive that bonds fibers to one another to make a mat of insulation.

Further, there is a present need for a mat or loose fill, fibrous insulation having a dispersed fungicide. Further, there is a present need for a manufacturing process for dispersing a fungicide throughout a fibrous insulation.

BRIEF SUMMARY OF THE INVENTION

The present invention provides a method of making a fibrous insulation by dispersing both a fungicide and a dispersed additive among a plurality of insulation fibers, followed by affixing the dispersed additive in place on the fibers. An advantage of the invention is that the fungicide is dispersed in a controlled concentration. Further, mold resistance of the fibrous insulation is enhanced. Further, the fibers are treated with fungicide during a formation stage of making fibrous insulation. A fungicide, herein, refers to a substance that destroys a fungus, as well as, a fungistat that inhibits or prohibits the growth of a fungus. According to embodiments of the invention, the fungicide is combined with the dispersed additive, for example, by being dissolved or absorbed in the dispersed additive, or by being mixed with the dispersed additive, such as, by chemical bonds or by an emulsion, for example.

The method of the present invention alternatively makes loose fill insulation, wherein the dispersed additive is affixed on the fibers of the insulation. The dispersed additive affixes by physical, chemical or electrostatic interaction with the fibers. Alternatively, loose fill insulation is made by chopping and/or grinding a mat of fungicide treated fibers into small pieces, which are packaged.

The method of the present invention alternatively makes a mat of insulation, such as, batts, rolls, duct liner, or boards, for thermal or acoustic insulation, wherein the dispersed additive is a binder that bonds the fibers to one another.

According to another embodiment of the present invention, the method further includes the step of controlling the fungicide concentration relative to a unit measure of dispersed additive and a unit measure of fibers.

According to another embodiment of the invention, the present invention provides a method of making a fibrous insulation by dispersing a fungicide and a binder on a plurality of fibers, followed by, accumulating the fibers and the dispersed fungicide and binder, and curing the binder. An advantage of the invention is that the binder becomes mold resistant. Another advantage of the invention is that the fungicide is in the binder that bonds the fibers to one another.

According to another embodiment of a method of the present invention, the method further includes a step of combining the fungicide and a binder in a fluid binder mix. The advantage, is that the fluid borne binder serves as a dispersed additive, and further is used as a dispersing agent for dispersing the fungicide.

According to another embodiment of the present invention, the method further includes a step of combining the fungicide with water, followed by the step of mixing the binder and the fungicide in a fluid binder mix.

According to another embodiment of the present invention, the method further includes the step of stabilizing dispersal of the fungicide with an emulsifier.

According to another embodiment of the present invention, the method further includes the steps of, dispersing a fungicide on a plurality of fibers, followed by, dispersing a binder among the plurality of fibers, accumulating the fibers and the dispersed fungicide and dispersed binder, and curing the binder.

According to another embodiment of the present invention, the method further includes the step of controlling the fungicide concentration to limit instability of one or more physical properties of fibrous insulation.

Further, the present invention provides a fibrous insulation having a fungicide in a binder, the binder being dispersed among a plurality of fibers, and the binder bonding the fibers to one another.

According to an embodiment of the present invention, the fungicide concentration is controlled relative to a unit measure of the binder dispersed on a unit measure of the fibers.

According to a further embodiment of the invention, the fungicide concentration is controlled below a toxic level.

According to a further embodiment of the invention, the fungicide concentration is controlled to limit instability of the physical properties of the insulation.

According to another embodiment of the invention, a water vapor retarder covers at least a major surface of the mat.

According to another embodiment of the invention, a water vapor retarder that has a fungicide covers at least a major surface of the mat.

Other embodiments of the invention are apparent by way of example from the following detailed description taken in conjunction with the accompanying drawings.

DETAILED DESCRIPTION OF THE INVENTION

Figure 2A:
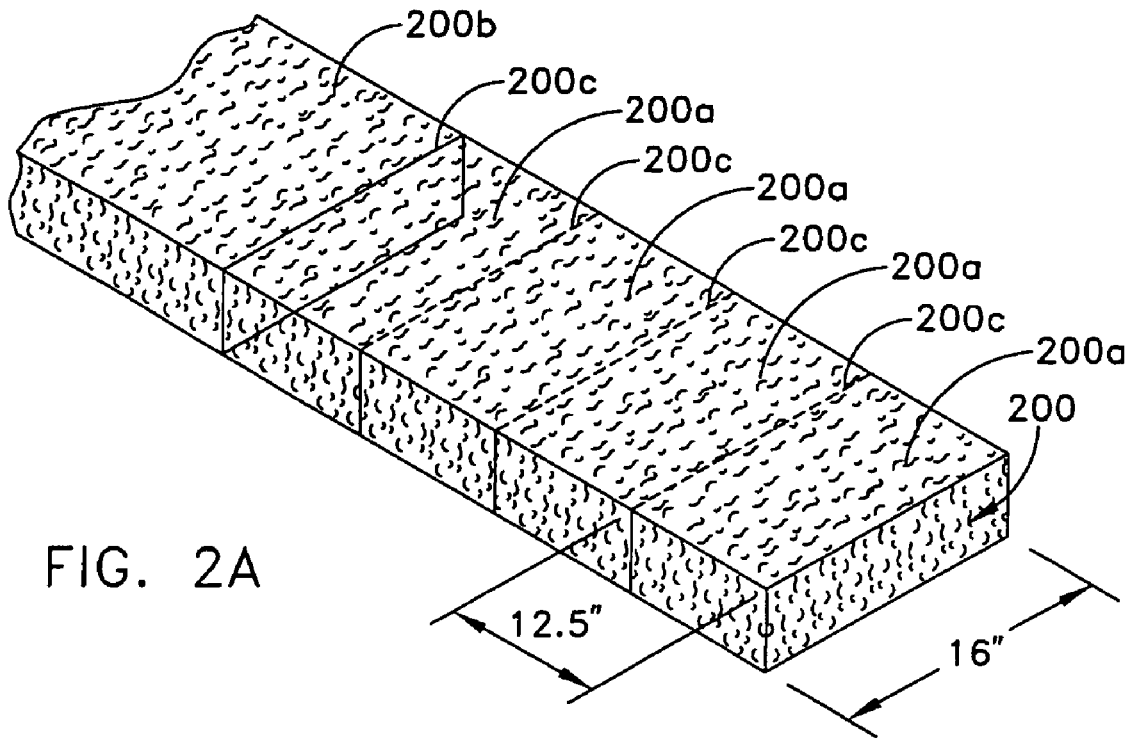
FIG. 2A is an isometric view of fibrous insulation.

FIG. 2A discloses a fibrous insulation that includes a mat (200) of insulation fibers bonded together with a binder. The R-value of the insulation refers to the insulation's effectiveness to retard heat transfer. The thickness of the mat (200) is generally proportional to the R-value. The mat (200) is then cut into pieces, referred to as batts. The batts are referred to herein to include rolls, or shorter unrolled lengths of single piece construction, as shown at (200b), or are further partially cut along kerfs (200c) to form multiple segments (200a) that can be separated from the batts by tearing or cutting along the kerfs (200c). The batts have desired widths and lengths for installation in respective cavities in a hollow wall or in an attic of a building.

Figure 2B:
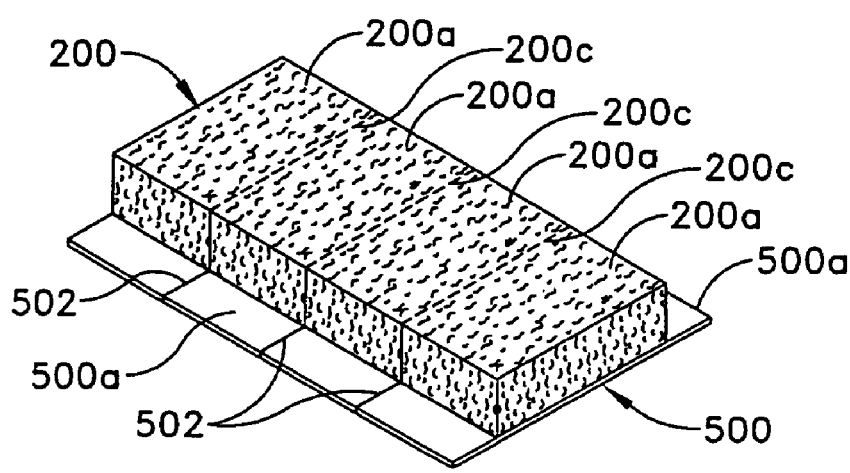
FIG. 2B is a view similar to FIG. 2A and disclosing fibrous insulation covered by a vapor retarder.
Figure 3:
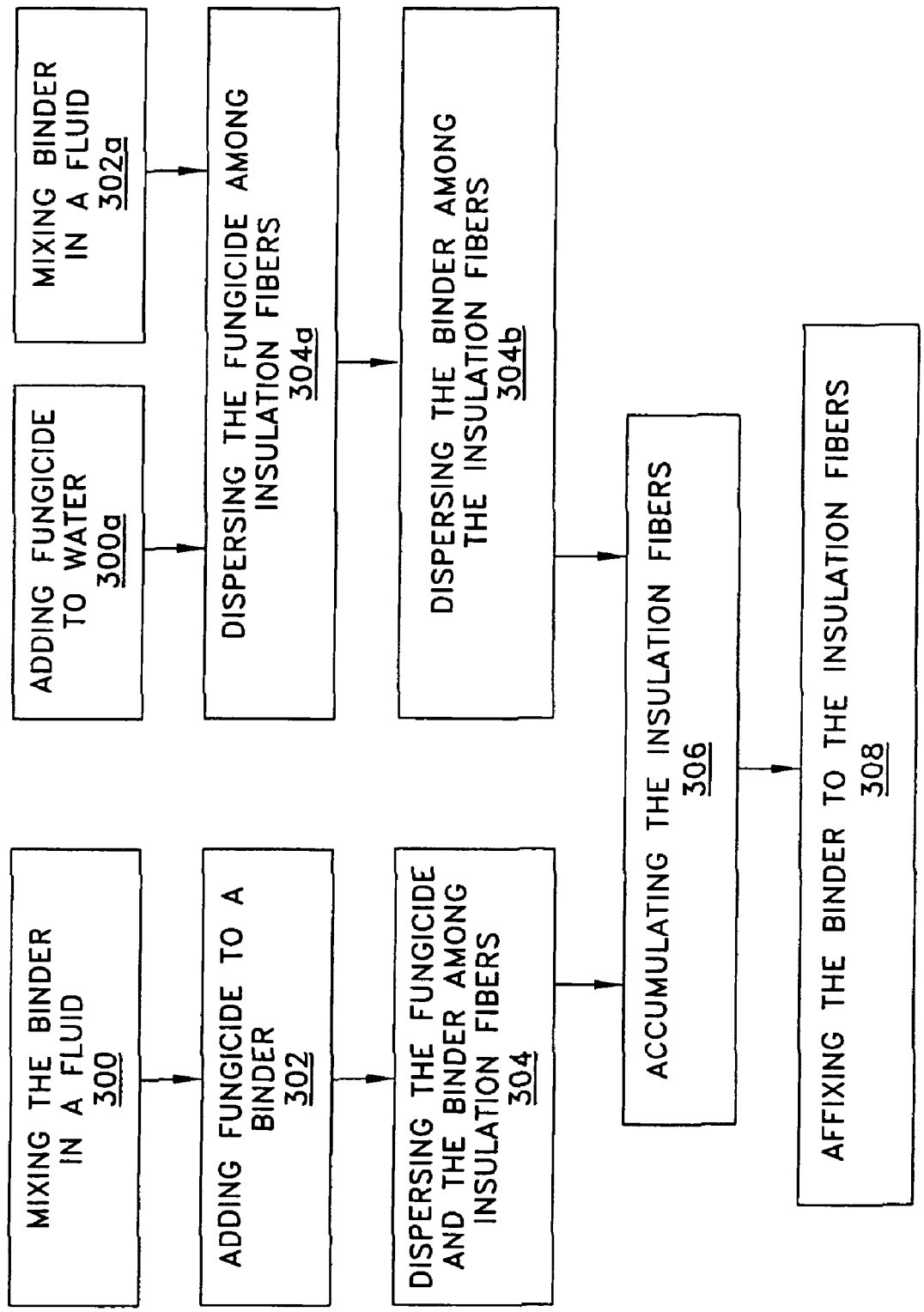
FIG. 3 is a flow diagram of various embodiments of a method for dispersing a fungicide and a dispersed additive, followed by accumulating fibers having the fungicide combined with the dispersed additive.

As disclosed by FIG. 2B, the batts are either covered, or faced, with a water vapor retarder (500) in the form of a vapor retarding film, or are uncovered, or unfaced, as disclosed by FIG. 2A. Faced batts may be used in the same places that unfaced batts are used. The unfaced batts are suitable for installation behind a separately installed vapor retarder. The unfaced batts are especially suitable for stacking on existing attic insulation to augment the attic insulation R-value.

A covered batt is an insulation batt that is covered, or faced, with a water vapor retarder (500), in the form of a vapor retarding film that includes, but is not limited to, Kraft paper coated with a bituminous material or other vapor retarder material, Polyamide (PA), Polyethylene (PE), Polypropylene (PP), Polybutylene (PB), Polyvinylchloride (PVC), Polyvinylacetate (PVA), Polyethylene terapthalate (PET), Polyvinylidene chloride (PVDC), polyester, polystyrene, polypropylene, fluoropolymer, polyvinyl, polyurethane, polycarbonate and combinations thereof, and further including, but not limited to, co-extrusions of two or more polymers thereof. A vapor retarding film, either forms a barrier to transmission of water vapor, or has a vapor transmissivity that selectively transmits water vapor depending on the relative humidity of ambient air. The water vapor retarder (500) covers at least a first major surface of each batt. Alternatively, the water vapor retarder (500) covers one or more surfaces of a batt including the side portions of each batt. The water vapor retarder (500) can be treated with a concentration of a fungicide or biocide.

The batts are typically installed to fill cavities between framing members of a building frame. The water vapor retarder (500) may further have side tabs or flaps (500a) that are fastened to the framing members, which secure the batts in place, and which optionally extend the side tabs or flaps (500a) to cover the framing members. When the batts are partially divided into the segments (200a), the water vapor retarder (500) is further partially divided into segments by perforations (502).

In a forming stage, the mat (202) is typically formed, first, by manufacturing the fibers (104), followed by shaping the fibers (104) into a falling, flowing stream of fiber veils or fiber wool. A binder is applied to the stream of fibers (104), followed by, accumulating the fibers (104) on a conveyor to form a thick mat of the fibers (104) wherein, the conveyor includes a conveyor belt or a forming chain. The fibers (104) are accumulated by various methods. A known accumulation method tends to distribute the fibers (104) in a random distribution, to form a mat having variations in density throughout. By contrast, a known air-laid method tends to distribute the fibers (104) in an even distribution to form a mat having a constant density throughout. Then the binder is cured to provide a mat of fibers (104) bonded to one another with the cured binder. For example, U.S. Pat. No. 4,090,241 discloses apparatus for manufacturing flowing glass fibers by a flame attenuation process, and forming a thick mat of fibrous insulation on a forming chain. Alternatively, the glass fibers are manufactured by a rotary spin process, for example, as described in WO 02/070417.

Figure 1:
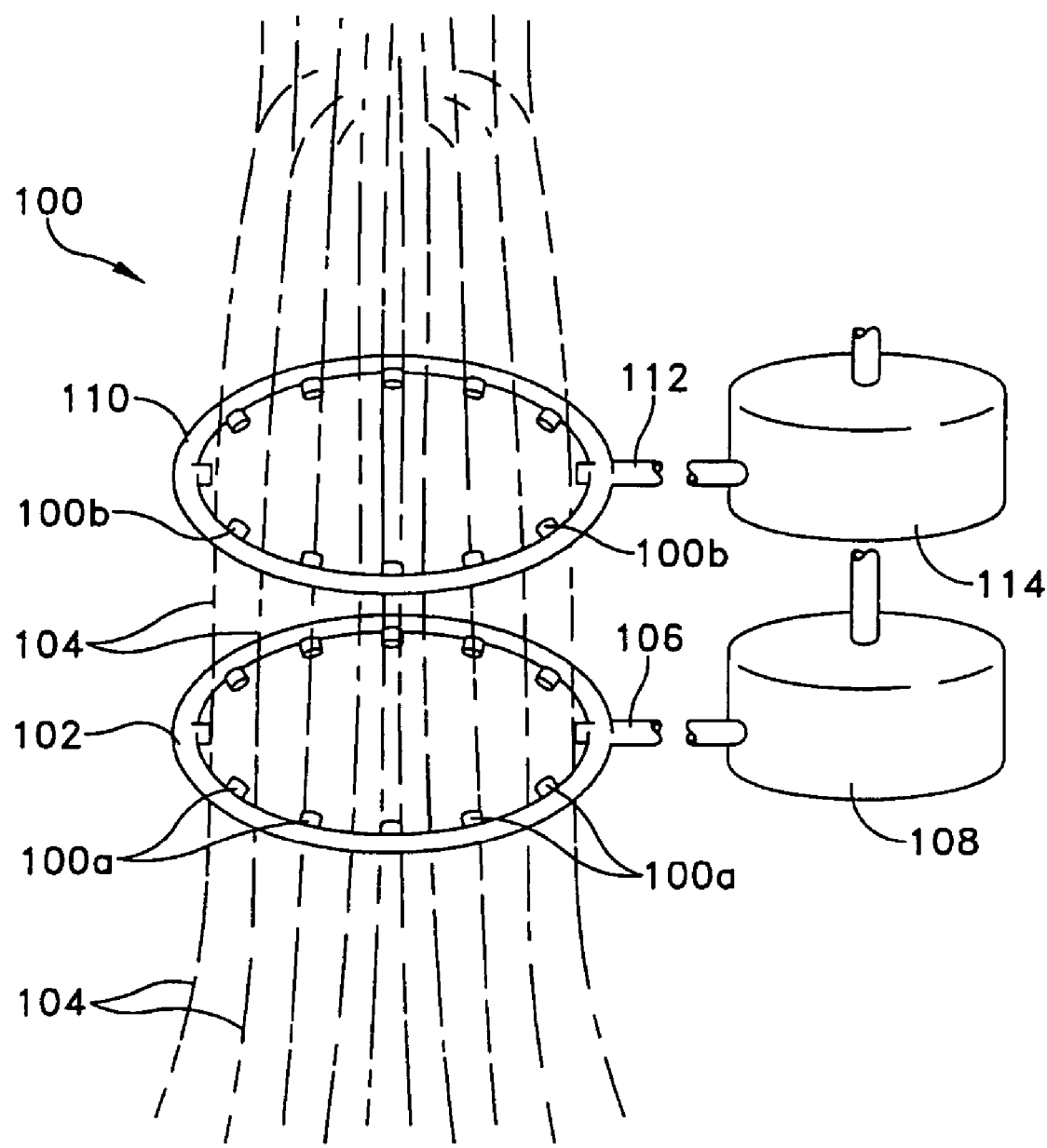
FIG. 1 is a diagrammatic view of an apparatus for dispersing a fungicide and a dispersed additive among insulation fibers.

FIG. 1 discloses a portion of a forming stage apparatus (100) for forming fibrous insulation. The apparatus (100) has a binder application ring (102) that surrounds a flowing stream of fibers (104). The binder application ring (102) is a hollow pipe having multiple nozzles (100a) facing inwardly of the ring (102) and toward the flowing stream of fibers (104). The binder application ring (102) has an inlet (106) into which a fluid binder mix supplied from a fluid binder mix tank (108) is pumped under pressure. The nozzles (100a) disperse the binder among the fibers (104) as they flow through the ring (102). According to an embodiment of the invention, a binder resin is combined and mixed with a fluid, including, but not limited to water, to form a fluid binder mix having a binder in solution or in suspension as an emulsion or as particulates in suspension. According to an embodiment of the invention, the fluid binder mix serves as a dispersed additive that improves the usefulness of the fibrous insulation. Typically, the binder is further combined and mixed with the fluid together with a catalyst, a coupling agent and a dust retarding oil. Further, the fluid binder mix may have a fire retarder, infrared reflecting or infrared absorbing material, other ion donor materials, any of which increases the usefulness of the insulation.

With further reference to FIG. 1, the apparatus (100) has a water overspray ring (110) that surrounds the flowing stream of fibers (104) upstream from the binder application ring (102). The water overspray ring (110) is similar in construction to the binder application ring (102), by having multiple nozzles (100b) facing inwardly and toward the flowing stream of fibers (104). The water overspray ring (110) has an inlet (112) into which water, either potable water supplied by a municipal source, or process water known as wash water, is pumped under pressure from a water overspray tank (114). The water is dispersed through the nozzles (100b) to cool the fibers (104) with water as they flow through the ring (110). According to an embodiment of the invention, the ring (110) and nozzles (100b) disperse the fungicide among the insulation fibers (104), followed by the nozzles (100a) dispersing the binder among the fibers (104) as they flow through the ring (102).

According to an embodiment of the present invention, the apparatus (100) for applying a binder to fibers (104) further applies a fungicide of controlled concentration to disperse throughout the fibers (104). The binder is a dispersed additive that is dispersed among the fibers (104) In an exemplary embodiment of the invention, the dispersed additive serves as a dispersing agent for dispersing the fungicide. The concentration is controlled by measuring the concentration of the fungicide relative to a measured volumetric unit or mass unit of binder dispersed for each a measured volumetric unit or mass unit of fibrous insulation. The fungicide is dispersed with the binder throughout the fibers (104) by using the binder application ring (102) as a fungicide applicator, as well as, a binder applicator. The manufacturing apparatus (100) may have multiple streams of the fibers (104) and multiple rings (102) and (110). Thereafter, the fibers (104) having the dispersed binder and dispersed fungicide are accumulated to form a thick mat of fibers (104). When the binder is cured, the fungicide is in the cured binder and is dispersed by the binder that bonds together the fibers (104). Alternatively the apparatus (100) can use one or more rings (110) in the forming section of the apparatus (100) to disperse fungicide without the binder on corresponding streams of newly formed fibers (104). Thereby, the fungicide treated fibers (104) are manufactured as loose fill insulation substantially free of binder.

In the past, U.S. Pat. No. 6,399,694 discloses that a fungicide could be added to a finished mat while still on the conveyor, intending for the fungicide to be on the binder after the binder has been cured. Alternatively, the fungicide was field applied, by adding the fungicide to the batts at a location where the batts were to be installed.

Further, prior to the invention, the fungicide was unevenly applied to various fibers, since the fungicide was added to a mat that is thick and often dense, causing uneven dispersal among the various fibers. Further, the fibers in the mat were already connected to one another via the binder, which further produced varied density in the mat to block the fungicide from some of the fibers. Since the fungicide was added after manufacturing of the mat, no manufacturing controls were in place to assure that the fungicide was distributed throughout the mat. Further, the fungicide was handled and applied at potentially toxic levels of concentration. Further, no manufacturing tests were performed to determine whether the fungicide would alter the physical properties of the insulation. Manufacturing tests would indicate the presence of instability of the physical properties, and especially whether the fungicide treated insulation would meet industry standards for thickness recovery and other physical properties.

According to an embodiment of the invention, a fungicide is dispersed among insulation fibers, and a dispersed additive is dispersed among the insulation fibers. The dispersed additive is a binder that is mixed in a fluid, preferably water, to provide a fluid binder mix supplied by the fluid binder mix tank (108).

According to another embodiment of the invention, a fungicide is combined with a fluid binder mix that includes the binder in a fluid, preferably water. The fungicide mixes in the fluid binder mix, either by dissolving or by suspension as an emulsion or as a precipitate in suspension, and is chemically compatible with the binder. The binder mixes in the fluid, either by dissolving or by suspension. Preferably the binder and the fluid form an emulsion. For example, the binder typically includes a curable acrylic or phenolic (phenol-formaldehyde) resin or other thermosetting resins such as epoxies and polyesters, as well as, urea, lignin, a silane, de-dusting oil and/or ammonia. Further, an emulsion will mix with an emulsified mix of further components, such as, a fire retardant and/or an ionized solution for treating insulation fibers (104) with a desired ion. The fluid binder mix is supplied by the fluid binder mix tank (108). Further, an emulsion of the fluid binder mix will combine readily with the fungicide.

The fungicide can be combined with the fluid binder mix and mixed by agitation performed, for example, by stirring in the tank (108) or by injecting the fungicide into the fluid binder mix in the tank (108) or into the inlet (106). Constant agitation with an industry known stirrer, and/or an emulsifier is added to maintain an immiscible fungicide or fungicide precipitates in suspension. For example, an emulsifier includes, and is not limited to, an oil emulsion of Mulrex 90, a trademark of Exxon Mobil Corporation.

When the fibers (104) are accumulated, and the binder is cured, the fungicide will preferably be emulsified with the binder, and will be dispersed among the fibers (104). Microphotographs have been taken that disclose the dispersed binder as nodes of droplets or particles adhered to the fibers. Accordingly, the dispersed binder distributes or disperses a controlled concentration of the fungicide among the fibers (104).

According to another embodiment of the invention, a fungicide is added to the overspray water and stirred in the overspray water tank (114), or is injected into the tank (114) or into the inlet (112). This embodiment separates the fungicide from the fluid binder mix, and is especially suitable when the fungicide is chemically incompatible with the binder, and/or when fungicide low solubility requires continuous agitation of the water by a stirrer, for example, to remain in solution or in suspension, and/or when an emulsifier is added to maintain an immiscible fungicide and/or precipitates of the fungicide in suspension. Further, this embodiment of the invention separates a chemically incompatible emulsifier and/or precipitates from the fluid binder mix in the fluid binder mix tank (108). The fungicide is applied to the fibers by the water overspray ring or water application ring (110). The nozzle (100*b*) orifices are large enough to pass precipitate particles of the fungicide. Further, an embodiment of the apparatus (100) has air atomized nozzles (100*b*) to further clear the nozzle (100*b*) orifices of precipitate particles. The water overspray ring (110) is upstream from the binder application ring (102) that disperses the fluid binder mix among the fibers. The fungicide is dispersed by the water among the fibers (104), using the water application ring (110) as a fungicide applicator, as well as, a water applicator. Thereafter, the fluid binder mix is dispersed among the fibers (104) by the ring (102) to combine with the dispersed fungicide. When the fibers (104) are accumulated, and the binder is cured, the fungicide will have been combined with the binder, preferably as an emulsion, and the binder is dispersed throughout the fibers (104) to distribute the fungicide throughout the fibers (104). Further the binder is affixed to the surfaces of the fibers (104). During the affixing step the binder is cured to affix the binder to the fibers (104). The fibers (104) are bonded to one another by the binder. Alternatively, the ring (110) may be used to disperse solely the fungicide without the binder among newly formed fibers (104), which fibers (104) are accumulated and chopped into pieces, and further packaged as loose fill insulation treated with fungicide.

FIG. 3 discloses an embodiment of a method for making fibrous insulation by a method step (300) of mixing the binder in a fluid to form a fluid binder mix, for example, as an emulsion, as a particulate suspension or as a solution. The method further includes a method step (302) of adding a fungicide to a binder, for example, by first dissolving the fungicide in water to provide a liquid that is easily added to a fluid binder mix. The method steps (300) and (302) are an example, of combining a fungicide and a binder. The combined fungicide and binder, for example, as combined in the fluid binder mix, are supplied by the binder fluid tank (108) to the ring (102), followed by a method step (304) of dispersing the fungicide and the binder among the insulation fibers (104). The binder application ring (102) is used to perform the step (304). The method step (304) is followed by a method step (306) of accumulating the fibers to form an insulation mat (200) having a plurality of fibers (104) and the dispersed fungicide and binder, followed by a method step (308) of affixing the binder with the fungicide therein to the insulation fibers (104). For example, the method step (308) is performed by applying heat and curing the binder to a stable condensed emulsion having the fungicide therein. The mat (200) comprises uncovered fibrous insulation for thermal or acoustic insulation or duct liner, and/or which can be sliced and/or chopped into the batts (200*b*) and further sliced and/or chopped into the segments (200*a*). Alternatively, the mat (200) is chopped and/or ground into pieces to form loose fill insulation fibers (104) having the dispersed fungicide. Subsequently, the loose fill insulation fibers (104) are packaged as compacted loose fill insulation. Alternatively, the loose fill insulation fibers (104) may also be formed by the apparatus disclosed by FIG. 4 into compacted, loose fill insulation that is packaged in bags.

FIG. 3 further discloses an alternative embodiment of a method for making fibrous insulation by a method step (300*a*) of adding a fungicide to water, which can be supplied to the water overspray tank (114). Separately, step (302*a*) involves mixing a binder with a fluid to form a fluid binder mix. A fluid binder mix is produced, which is supplied to the binder fluid tank (108), for example. Thereby, the binder is separate from the fungicide that would have exhibited incompatibility with the binder.

Method step (304*a*) is performed by dispersing the fungicide among the fibers (104) for example, by the water overspray ring (110), followed by the method step (304*b*), dispersing the binder among the fibers (104), performed, for example, by the binder application ring (102) dispersing the fluid binder mix. The alternative method of method steps (300*a*), (302*a*), (304*a*) and (304*b*) are one embodiment of a method of dispersing the fungicide among the fibers (104) separately from dispersing the binder among the fibers (104), and thereafter, combining the fungicide and the binder. The dispersed fluid binder mix combines with the dispersed fungicide for a duration, during which method steps (306) and (308) are promptly performed to cure the binder, and to result in a fibrous insulation having a fungicide in a cured binder that is dispersed and affixed on the fibers (104). Further the fibers (104) are bonded to one another by the binder.

As an alternative to mixing a binder in a fluid at either step (302) or step (302*a*), the binder is alternatively in the form of a powder binder, and a powder binder-fungicide mix is made by combining the powder binder and the fungicide. The powder binder-fungicide mix is dispersed among the fibers (104) by forced air, or by electrostatic attraction to the fibers (104), for example, in substitution for the water used at step (304). The forced air is an air entrained mix of air and a powder binder-fungicide mix. For example, the dispersed concentration of the powder binder-fungicide mix relative to the mass of the fibers (104) can vary, as needed, for example, a 10% powder binder-fungicide mix, or a 20% powder binder-fungicide mix, or a 30% powder binder-fungicide mix. Thereafter follows the method step (306) of accumulating the fibers to form an insulation mat (200) having fibers (104) and the dispersed fungicide and binder, followed by the method step (308) of affixing the binder with the fungicide therein. During the method step (308) step the powder binder melts and combines with the fungicide, and the melted binder is cured to affix the binder to the fibers (104). Further the fibers (104) are bonded to one another by the binder.

For example, the loose fill insulation is produced in the forming stage apparatus (100) by chopping and/or grinding newly formed fibers into pieces, and/or by chopping a roll or batt of an insulation mat and/or scrap, edge trim and other types of pieces, which may or may not have a cured binder on the fibers thereof. FIG. 4 discloses another embodiment of a forming stage apparatus (100) for forming the loose fill insulation in a duct or mixer. Whether the loose fill insulation is selected as, newly formed fibers, fibers from chopped pieces or fibers having a cured binder, the loose fill insulation is fed through a loose fill transportation duct (400) into a mixer (402) that mixes loose fill insulation with a dispersed additive that is dispersed among the insulation fibers (104) of the loose fill insulation. The dispersed additive includes, but not limited to, an anti-static mix, for example, an emulsion of silicone and water, and/or mineral oil for dust reduction. For example, the dispersed additive is preferably in the form of an emulsion that will combine and/or mix with an emulsified mix of further components, such as, a fire retardant and/or an ionized solution for treating insulation fibers (104) with a desired ion. The fibers (104) are then fed to a compressor/packager (404) where they are compressed to remove air and increase density and to be packaged as loose fill insulation, shown as L. F. in FIG. 4.

For example, the forming section can use the ring (102) in a manner as previously described to disperse a fungicide and the dispersed additive among the fibers (104) of loose fill insulation. Alternatively, for example, either the mixer (402) or the loose fill transportation duct (400) can use the nozzles (100a) and (100b) similar to those on the rings (102) and (110). According to an alternative embodiment, solely fungicide without the binder is applied to loose fill insulation using only the ring (110), in the manner described herein, to produce loose fill insulation treated with dispersed fungicide, which can be compacted and packaged for sale. The nozzles (100b) are mounted on the sides of the mixer (402) or the duct (400) to disperse the fungicide among the fibers (104) of loose fill insulation inside the mixer (402) or the duct (400). The nozzles (100a) are mounted on the sides of the mixer (402) or the duct (400) to disperse the dispersed additive among the fibers (104) of loose fill insulation inside the mixer (402) or the duct (400). The dispersed additive is preferably an emulsion of the anti-static mix and/or mineral oil for dust reduction. The dispersed additive is dispersed among the fibers (104) to combine with the dispersed fungicide. Further, the dispersed additive in the mixer (402) affixes to the surfaces of the fibers (104), and is dried by process heat to remove excess water content.

Figure 4:
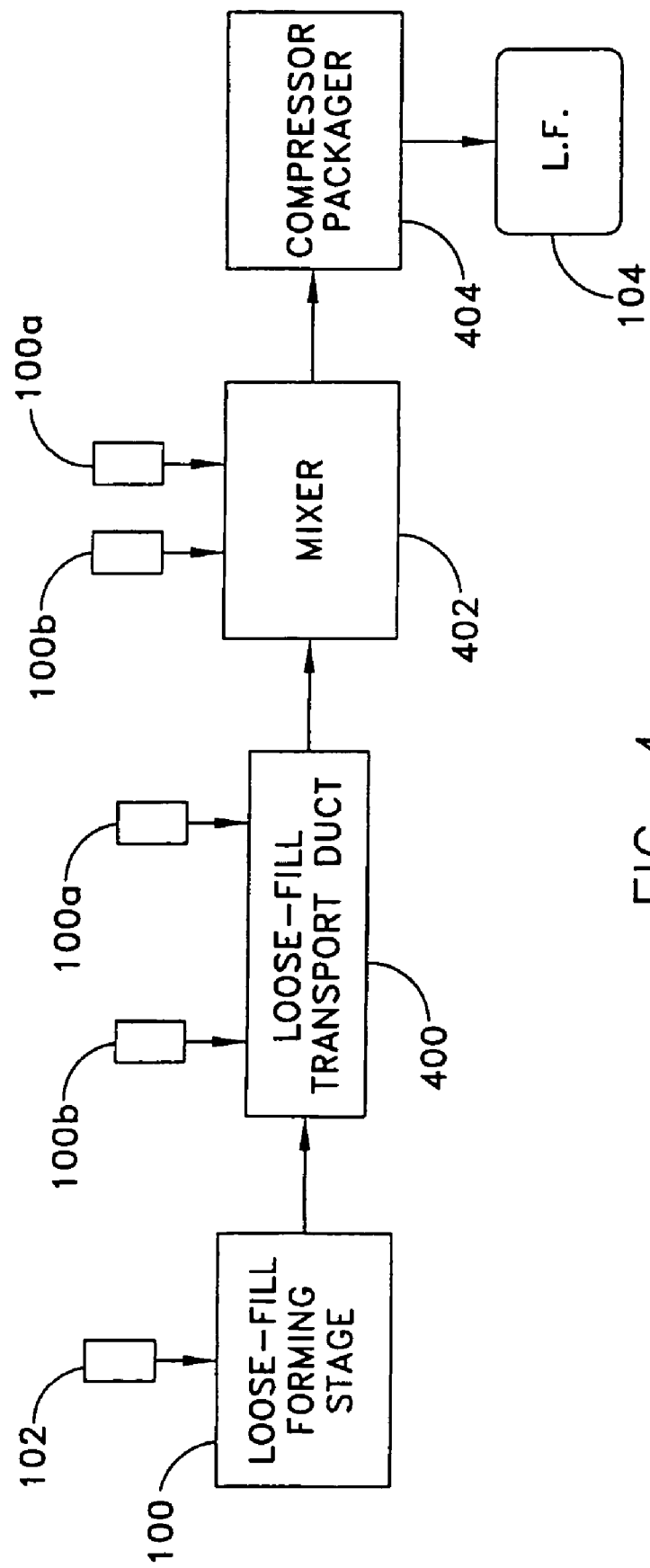
FIG. 4 is a diagrammatic view of an apparatus for dispersing a fungicide and a dispersed additive among insulation fibers for making loose fill, fibrous insulation.

The fibers (104) are fed to a compressor/packager (404) where they are compressed to remove air and increase density and be packaged as loose fill insulation, shown as L. F. in FIG. 4. Alternatively, by using only the nozzles (100b) on the ring (110) to disperse only fungicide, newly formed fibers (104) are treated with dispersed fungicide without the binder, and subsequently are packaged as binder free, loose fill insulation treated with dispersed fungicide.

The advantage of treating the insulation with fungicide at a manufacturing site, is that application of the fungicide is measured and controlled via a concentration of flow rate thereof through the nozzles (100b) and/or (100a). Thereby, the fungicide concentration is controlled relative to a unit measure of the dispersed additive and a unit measure of the fibers (104). Further, the fungicide concentration is controlled below a toxic level to humans and small mammals, such as, dogs and cats.

A discussion now follows concerning tests that refer to potential biocides according to their physical properties, their concentrations and effectiveness as fungicides on fibrous insulation, and their compatibility with fluid binder mixes.

The American Society For Testing Materials provides an ASTM C1338 Standard Test Method for Determining Fungi Resistance of Insulation Materials and Facings. An insulation material and/or facing can pass the test when supporting mold growth that is less than would be supported by a strip of white birch or southern yellow pine over a 28 day test at 30 degrees C., and 95% relative humidity. Test fungi are: *Aspergillus Niger, Aspergillus Versicolor, Penicillium Funiculosum, Chaetomium Globosum* and *Aspergillus Flavus*.

An ASTM C1338 Standard test of fungal resistance was conducted. An 800-gram batch of phenolic resin binder (solution) was prepared with 3% dissolved binder solids to yield a 10% binder content in a cured test sheet. The batch was divided into five 150-gram portions. One of the binder portions had no antifungal agent addition, which served as a control binder. Each of four of the 150-gram binder portions was spiked with 1.0% solids of an antifungal agent. This concentration of antifungal agent was equal to 0.10% on the cured test sheet. The cured test sheet would have a fungicide concentration that could be adjusted to the manufacturer's recommended concentration for effectiveness to prevent mold growth. The manufacturer's recommended concentration of fungicide would be reproduced by having the fungicide dispersed by a binder in solution and dispersed on the fibers in a mat of fibrous insulation, followed by curing the binder.

Test sheets were prepared by cutting GF/C filter sheets (glass filter paper) into pieces measuring 6 inches by 8 inches. The sheets were saturated with the binder (solution), and excess binder was removed via a vacuum table. The sheets were cured at 180 degrees C. for 5 minutes in a Mathis laboratory grade dryer. A process control blank was prepared by saturating one sheet with deionized water instead of a binder. The individual test sheets were packaged in individual polyethylene bags and sent to a laboratory for testing according to ASTM C1338. A laboratory report of test results is disclosed by TABLE 1.

TABLE 1

| ITEM | A | B | C | RESULT |
|---|---|---|---|---|
| Glass filter paper with no binder | NGO | NGO | NGO | Pass |
| Glass filter paper with control binder | +++ | + | ++ | Fail |
| Glass filter paper with binder # 1477 | NGO | NGO | NGO | Pass |
| Glass filter paper with binder # 1478 | NGO | NGO | NGO | Pass |
| Glass filter paper with binder # 1479 | NGO | NGO | NGO | Pass |
| Glass filter paper with binder # 1480 | NGO | NGO | NGO | Pass |

1477 for ASTM C1338 Testing = Phenolic binder plus 1% 5 Mol Borax ($Na_2B_4O_7$—$5H_2O$) solids.
1478 for ASTM C1338 Testing = Phenolic binder plus 1% Zinc Oxide (ZnO) solids.
1479 for ASTM C1338 Testing = Phenolic binder plus 1% Sodium Propionate solids ($CH_3CH_2COO$)Na.
1480 for ASTM C1338 Testing = Phenolic binder plus 1% Calcium Propionate solids ($CH_3CH_2COO$)$_2$Ca.
Legend:
NGO = No growth observed,
+ = Growth observed.
++ = Growth exceeding reference control amount.
+++ = Growth far exceeding reference control amount.
−+ = Doubtful growth.

Test results of ASTM C1338 reveals fungal growth was observed on the sample having the control binder (no antifungal agent), and no growth observed for samples treated with the potential antifungal agents. This compares favorably with the allowable fungal growth amount observable on white birch and yellow pine control samples as specified by ASTM C 1338.

A thermal stability test was conducted on samples of each of the four potential fungicides or anti-fungal agents, Borax, Zinc Oxide, Sodium Propionate and Calcium Propionate. A 15 milligram sample was heated at a rate of 20 degrees C. per minute to 300 degrees C. The thermal gravimetric analysis (TGA) of lost weight per cent versus temperature rise indicated that from ambient temperature to 250 degrees C., the Borax lost 21% of its mass including the water of hydration, the Calcium Propionate lost 3%, the Sodium Propionate lost 0.1% and the Zinc Oxide lost 0.1%.

A binder (solution) stability test was conducted. A master batch was made up, of fluid binder mix having 6% binder solids and wash water for the binder make-up water. The wash water comprised tap water used for process water to continuously clean the equipment for making the various insulation embodiments of the present invention. The process water is filtered to remove solids, and is continuously recycled. An oil emulsion, Mulrex 90, comprised 10.3% of the binder solids. Five (5) 100-ml. aliquots of the binder were transferred to individual glass jars. Four of the binders were spiked with a corresponding antifungal agent, Borax, Zinc Oxide, Sodium Propionate and Calcium Propionate, at a concentration of 2% of the binder solids. The remaining binder sample was not spiked to serve as a control sample. The binder samples were stirred for 24 hours in covered jars to prevent evaporation. After the 24 hour aging, the binders were removed from the stirrer and observed for destabilization. The 24 hour stability results are disclosed by Table II.

TABLE II

| SAMPLE FLUID BINDER MIX | COMMENTS |
| --- | --- |
| Control | Stable; no separation, very slight surface scum |
| Binder 1477 with Borax | Stable: slightly greater surface scum than control |
| Binder 1478 with Zinc Oxide | Unstable; coagulates settle to bottom of container |
| Binder 1479 with Sodium Propionate | Stable: a few dark particles on the surface of the binder |
| Binder 1480 with Calcium Propionate | Stable: a few dark particles on the surface of the binder and a small quantity of a dark sticky film on the bottom of the container | used as the binder make-up water. Five (5) 100-ml. aliquots of the fluid binder mix were transferred to 150 ml. beakers. One aliquot was used as a control, and the remaining four aliquots were spiked with 0.12 grams of one of the four potential fungicides or anti-fungal agents, Borax, Zinc Oxide, Sodium Propionate and Calcium Propionate. This addition was equal to 2.0% fungicide solids or anti-fungal agent solids based on the total binder solids. Each binder was used to prepare tensile strength test specimens. The test specimens (coated Whatman GF/C filter paper) were cured at 180 degrees C. for 5 minutes in a Mathis Laboratory Drier and tested in accordance with CertainTeed Test Method T496 I. The tensile strengths of the test specimens were measured, and the results are reported in TABLE III.

TABLE III

TENSILE STRENGTH IN NEWTONS (maximum at break)

| Sample | Control | | Borax | | ZnO | | Sodium Propionate | | Calcium Propionate | |
| --- | --- | --- | --- | --- | --- | --- | --- | --- | --- | --- |
|  | Dry | Wet | Dry | Wet | Dry | Wet | Dry | Wet | Dry | Wet |
| 1 | 16.2 | 16.7 | 24.1 | 16.5 | 19.9 | 20.4 | 19.3 | 20.1 | 18.9 | 22.8 |
| 2 | 17.5 | 25.9 | 23.5 | 21.2 | 23.5 | 17.1 | 19.9 | 20.2 | 21.2 | 27.6 |
| 3 | 22.0 | 19.1 | 22.9 | 22.8 | 17.9 | 22.5 | 22.9 | 22.6 | 22.6 | 22.8 |
| 4 | 22.7 | 21.3 | 23.1 | 23.2 | 22.8 | 16.6 | 21.5 | 20.5 | 29.1 | 19.6 |
| 5 | 26.5 | 22.0 | 21.1 | 18.4 | 21.1 | 21.7 | 22.8 | 15.1 | 23.3 | 19.5 |
| 6 | 27.1 | 22.2 | 22.7 | 19.4 | 18.4 | 20.9 | 20.2 | 20.1 | 23.2 | 13.7 |
| MEAN | 22.0 | 21.2 | 22.9 | 20.3 | 20.6 | 19.9 | 21.1 | 19.8 | 23.1 | 21.0 |
| STD. DEVIATION | 4.5 | 3.1 | 1.0 | 2.6 | 2.3 | 2.4 | 1.5 | 2.5 | 3.4 | 4.6 |
| Specimen moisture % | 0.40 | 1.48 | 0.36 | 1.43 | 0.26 | 1.40 | 0.33 | 1.57 | 1.43 | 2.87 |
| Avg. LOI % (of 6) | 23.6 | 23.7 | 23.1 | 23.4 | 22.5 | 22.4 | 20.1 | 19.4 | 24.6 | 24.9 |
| Wet/dry tensile % | 96.4% | | 88.4% | | 96.4% | | 93.7% | | 91.1% | |

Accordingly, the test results of Table II indicated a need for continuous agitation and/or an emulsifier in the fluid binder mix to resist precipitation of the fungicides or anti-fungal agents when used in a manufacturing process. The Borax fungicide was indicated as a preferred embodiment that exhibited the least instability, if any.

A wash water stability test was conducted with 150 grams of wash water plus 0.75 grams (0.5%) of one of the four potential anti-fungal agents, Borax, Zinc Oxide, Sodium Propionate and Calcium Propionate. No oil emulsion was added. The wash water comprised tap water used for process water to continuously clean the equipment for making the various insulation embodiments of the present invention. The process water is filtered to remove solids, and is continuously recycled. The stability test was repeated with 1.0% of each of the four potential antifungal agents. After 2 hours of aging in sealed glass jars, the control wash water (no anti-fungal agent) and the 0.5% Borax sample showed insignificant precipitation of the Borax solids. The other samples, including the 1.0% Borax sample showed significant solids precipitation. Accordingly, the test indicated a need for continuous agitation and/or an emulsifier to resist precipitation of the anti-fungal agents in water when used in a manufacturing process.

A tensile strength test was conducted using Whatman GF/C filter paper as the substrate. A 500-gram batch of fluid binder mix was prepared with 6% binder solids in binder wash water. De-ionized (DI) water without an emulsifier was Further, recovery tests of fibrous insulation at 30 day shelf life, and at 60 day shelf life, were conducted on glass fiber insulation batts chopped from mats having corresponding R-value thicknesses of R19 and R30. R19 batts and R30 batts were made with glass fibers with a binder having 2% Borax in the binder. The Borax comprises a fungicide or anti-fungal agent in the binder and dispersed by the fluid binder mix on the fibers. TABLE IV discloses the results of 30 day shelf life tests. TABLE V discloses the results of 60 day shelf life tests.

TABLE IV

30 DAY SHELF LIFE TESTING R-19 AND R-30 BATTS WITH AND WITHOUT 2% BORAX IN A PHENOLIC RESIN BINDER

| BattType | Standard Compared to 2% Borax Dead (Avg.) | Standard Compared to 2% Borax Drop (Avg.) | Rigidity Index Std./2% Borax | Standard Compared to 2% Borax Rigidity Index | Standard Compared to 2% Borax Tensile (lbs./in) |
| --- | --- | --- | --- | --- | --- |
| R-19 16" wide | 5.42% | 6.72% | 0.475/0.475 | 0.00% | 19% |
| R-19 24" wide | 0.40% | 5.55% | 0.53/0.47 | 13% | 4.1% |
| R-30 16" wide | 2.64% | −2.89% | 0.525/0.535 | −1.87% | 6.0% |
| R-30 24" wide | −4.06% | −1.85% | 0.555/0.525 | 5.7% | −8.2% |
| Sum of comparison percentages wherein, Std. >2% Borax batt type | 61.52% | | | | |
| Average of comparison percentages wherein, Std. >2% Borax batt type | 3.85% | | | | |

TABLE V

60 DAY SHELF LIFE TESTING OF R-19 AND R-30 BATTS WITH AND WITHOUT 2% BORAX IN A PHENOLIC RESIN BINDER

| BattType | Standard Compared to 2% Borax Dead (Avg.) | Standard Compared to 2% Borax Drop (Avg.) | Rigidity Index Std./2% Borax | Standard Compared to 2% Borax Rigidity Index | Standard Compared to 2% Borax Tensile (lbs./in) |
|---|---|---|---|---|---|
| R-19 16" wide | 0.77% | −2.66% | 0.57/0.54 | 5.6% | −13% |
| R-19 24" wide | 2.88% | 0.84% | 0.51/0.50 | 2.0% | −7.8% |
| R-30 16" wide | 0.43% | 4.29% | 0.55/0.54 | 1.8% | 3.8% |
| R-30 24" wide | −6.79% | 0.76% | 0.54/0.49 | 10% | 9% |

Sum of comparison percentages wherein, Std. >2% Borax batt type    11.72%
Average comparison percentages wherein, Std. >2% Borax batt type    0.73%

The test results of four products tested for five different properties of TABLE IV and TABLE V indicate that, for 10 of 16 test results for Table IV, and 12 of 16 test results for Table V, standard product having fibers with a dispersed binder having no fungicide or anti-fungal agent had better physical properties than product with 2% Borax in the binder. The properties tested were dead pin and drop fluff thickness, rigidity and tensile strength. For example, at 60 days shelf life testing for the properties measured, the average property measured for standard product was 0.73% better in physical properties than the product having 2% Borax in the binder. The comparison percentages shown in the Tables IV and V were calculated both, as the sum of percentages, and as the average of percentages. Accordingly, a binder for fibrous insulation having a fungicide or anti-fungal agent in the binder is shown, by the tests herein, to induce instability in the physical properties of fibrous insulation.

When the tests were repeated, they were conducted at 100 day shelf life for R-19 and R-30 insulation. The physical properties of the product having 2% Borax in the binder gained, relative to the physical properties of the standard product. Despite the gain, the tests for physical properties, considered as a whole, have indicated instability in the physical properties of the 2% Borax treated insulation relative to untreated insulation. Table VI discloses the test results for 100 day shelf life.

TABLE VI

100 DAY SHELF LIFE TESTING OF R-19 AND R-30 BATTS WITH AND WITHOUT 2% BORAX IN A PHENOLIC RESIN BINDER

| BattType | Standard Compared to 2% Borax Dead (Avg.) | Standard Compared to 2% Borax Drop (Avg.) | Rigidity Index Std./2% Borax | Standard Compared to 2% Borax Rigidity Index | Standard Compared to 2% Borax Tensile (lbs./in) |
|---|---|---|---|---|---|
| R-19 16" wide | −2.20% | −3.63% | 0.51/0.52 | −1.9% | −27% |
| R-19 24" wide | −1.83% | 0.70% | 0.50/0.49 | 2.0% | −8.5% |
| R-30 16" wide | 0.00% | −1.81% | 0.54/0.55 | −1.8% | 15% |
| R-30 24" wide | 2.22% | 0.46% | 0.53/0.50 | 6.0% | 16% |

Sum of comparison percentages wherein, Std. >2% Borax batt type    −6.29%
Average of comparison percentages wherein, Std. >2% Borax batt type    −0.39%

Accordingly, the invention provides a manufacturing method to control the fungicide concentration relative to a unit measurement of binder dispersed in a unit measurement of fibers. The fibers with a dispersed fungicide subsequently are formed into fibrous insulation having a controlled fungicide concentration that avoids excessive alteration or instability in the physical properties of the fibrous insulation. Compensation for loss in binder strength and other physical properties may be accomplished by increasing the measurement unit of binder content relative to the measurement unit of fungicide concentration.

Further, the present invention provides a manufacturing method to control the fungicide concentration, by controlling the measurement unit of fungicide relative to the measurement unit of binder content. Controlling the measurement unit of fungicide would be important to control a fungicide concentration below a toxic level. Although a fungicide may not have an established manufacturer's recommended concentration, the present invention would provide a manufacturing method to control fungicide concentration so as to comply with a manufacturer's recommended concentration that would be established in the future.

R-13 batts were tested for physical properties having 0%, 1.5% and 3% Borax in the binder. All binder variations met the ASTM requirements for water vapor sorption, for ASTM E136 non-combustibility, and ASTM E970 for Critical Radiant Flux. All had similar results for ASTM C665 for corrosiveness to steel, copper and aluminum. Solely the batts with 3% Borax in the binder failed the ASTM C1304 odor emission test. The 90 day shelf life testing of the R-13 batts provided dead pin and drop fluff thickness, rigidity and tensile strength test values within acceptable limits for all three binder variations. Test results appear in TABLE VII.

TABLE VII

PHYSICAL PROPERTY TESTS OF R-13 BATTS COVERED WITH KRAFT PAPER HAVING ASPHALT COATING

| Physical Property | Standard Binder R-13 15" × 32' Kraft | 1.5% Borax in Binder R-13 15" × 32' Kraft | 3% Borax in Binder R-13 15" × 32' Kraft |
|---|---|---|---|
| Odor Emission | Pass | Pass | Fail |
| Water Vapor Sorption % by weight | 2.07 | 1.78 | 3.00 |
| ASTM E136 Combustibility | Pass | Pass | Pass |
| ASTM E970 Critical Radiant Flux | Pass | Pass | Pass |

According to the invention, any of the anti-fungal agents, or fungicides, includes and is not limited to, Borax, Zinc Oxide, Sodium Propionate, Calcium Propionate and derivatives and combinations thereof, is used in a binder according to the present invention, with Borax being the preferred fungicide. Further, Borax 5 mol is a preferred embodiment of a binder component according to the present invention.

While this invention has been disclosed with reference to specific embodiments, it is apparent that other embodiments and variations of this invention can be devised by others skilled in the art without departing from the true spirit and scope of the invention. The appended claims include all such embodiments and equivalent variations.

What is claimed is:

1. A method of making fibrous insulation, comprising:
   forming a plurality of newly formed insulation fibers at a forming stage;
   followed by dispersing a fungicide without a binder among the newly formed insulation fibers at the forming stage;
   accumulating the newly formed insulation fibers; and
   chopping the newly formed insulation fibers into pieces to provide a loose fill fibrous insulation treated with fungicide.

2. The method of claim 1, further comprising: compacting and packaging the loose fill fibrous insulation treated with fungicide.

3. A method of making fibrous insulation, comprising:
   chopping insulation fibers into pieces;
   conveying the pieces of insulation fibers along a transport duct;
   dispersing a fungicide without a binder among the pieces of insulation fibers; and
   accumulating the pieces of insulation fibers to provide a loose fill fibrous insulation treated with fungicide.

4. The method of claim 3, further comprising: compacting and packaging the loose fill fibrous insulation treated with fungicide.

5. A method of making fibrous insulation, comprising:
   dispersing a fungicide among a plurality of insulation fibers by dispersing the fungicide through nozzles and among the plurality of insulation fibers as the insulation fibers flow through a ring;
   followed by dispersing an additive having a binder content throughout the insulation fibers to combine the dispersed additive with the dispersed fungicide, wherein the binder content is increased relative to concentration of the dispersed fungicide to compensate for loss of binder strength in the combined binder content and dispersed fungicide; and
   affixing the dispersed binder content on the fibers by physical, chemical or electrostatic interaction with the fibers.

6. The method of claim 5, comprising:
   accumulating the fibers to form loose fill fibers having the additive and the fungicide dispersed among the fibers.

7. The method of claim 5, comprising:
   accumulating the fibers to form a mat having the additive and the fungicide dispersed among the fibers.

8. The method of claim 5, comprising:
   adding the fungicide to overspray water before dispersing the fungicide among the insulation fibers; and
   dispersing the fungicide among the insulation fibers by overspraying the insulation fibers with the fungicide and the overspray water through the nozzles.

9. The method of claim 5, comprising:
   adding the fungicide to an emulsifier before dispersing the fungicide among the insulation fibers, wherein the emulsifier stabilizes dispersal of the fungicide among the insulation fibers; and
   dispersing the fungicide among the insulation fibers by spraying the insulation fibers with the fungicide and the emulsifier through the nozzles.

10. A method of making fibrous insulation, comprising:
    dispersing a fungicide among a plurality of insulation fibers by dispersing the fungicide through nozzles and among the plurality of insulation fibers as the insulation fibers flow through a ring;
    dispersing water through the nozzles to cool the fibers;
    followed by dispersing an additive having a binder content throughout the insulation fibers to combine the dispersed additive with the dispersed fungicide, wherein the binder content is increased relative to concentration of the dispersed fungicide to compensate for loss of binder strength in the combined binder content and dispersed fungicide; and
    affixing the dispersed binder content on the fibers by physical, chemical or electrostatic interaction with the fibers.

11. A method of making fibrous insulation, comprising:
    dispersing a fungicide among a plurality of insulation fibers by dispersing the fungicide through nozzles and among the plurality of insulation fibers as the insulation fibers flow through a duct;
    followed by dispersing an additive having a binder content throughout the insulation fibers to combine the dispersed additive with the dispersed fungicide, wherein the binder content is increased relative to concentration of the dispersed fungicide to compensate for loss of binder strength in the combined binder content and dispersed fungicide; and
    affixing the dispersed binder content on the fibers by physical, chemical or electrostatic interaction with the fibers.

12. A method of making fibrous insulation, comprising:
    dispersing a fungicide among a plurality of insulation fibers by dispersing the fungicide through first nozzles and among the plurality of insulation fibers as the insulation fibers are mixed in a mixer;
    followed by dispersing an additive having a binder content throughout the insulation fibers by dispersing the additive through second nozzles and among the plurality of insulation fibers in the mixer to combine the additive with the fungicide among the insulation fibers in the mixer and to combine the dispersed additive having the binder with the dispersed fungicide, wherein the binder content is increased relative to concentration of the dispersed fungicide to compensate for loss of binder strength in the combined binder content and dispersed fungicide; and
    affixing the dispersed binder content on the fibers by physical, chemical or electrostatic interaction with the fibers.

13. A method of making fibrous insulation, comprising:
    dispersing a fungicide among a plurality of insulation fibers by dispersing the fungicide through first nozzles and among the plurality of insulation fibers as the insulation fibers flow through a first ring;
    followed by dispersing an additive having a binder content throughout the insulation fibers by dispersing the additive comprising the binder through second nozzles and among the plurality of insulation fibers as the insulation fibers flow through a second ring to combine the dispersed additive having the binder with the dispersed fungicide, wherein the binder content is increased relative to concentration of the dispersed fungicide to compensate for loss of binder strength in the combined binder content and dispersed fungicide; and
    affixing the dispersed binder content on the fibers by physical, chemical or electrostatic interaction with the fibers.

* * * * *